Aug. 18, 1959     T. FRAYER ET AL     2,900,052

CONSTANT CLEARANCE BRAKE ADJUSTER

Filed April 3, 1957

*INVENTOR.*
JOHN W. RUNNER
BY THEODORE FRAYER

*R. L. Miller*
ATTORNEY

United States Patent Office 2,900,052
Patented Aug. 18, 1959

2,900,052
CONSTANT CLEARANCE BRAKE ADJUSTER

Theodore Frayer, North Canton, and John W. Runner, Akron, Ohio, assignors to The Goodyear Tire & Rubber Company, Akron, Ohio, a corporation of Ohio Application April 3, 1957, Serial No. 650,395

4 Claims. (Cl. 188—73)

This invention relates to disc type brakes and is especially useful in providing automatic clearance adjustment of such brakes.

Heretofore, it has been proposed to provide disc type brakes, especially of the type known as spot type brakes, with means for automatically adjusting the brake clearance to compensate for wear. While such devices have gone into extensive commercial use, all devices of this nature heretofore proposed have responded not only to increase of brake clearance (due to lining wear) but also have responded to conditions of apparent excessive clearance brought about by springing, i.e., deflection of the brake elements within the elastic limit of the material, such as the non-rotatable brake support and the brake disc under a quick or a panic stop load.

Experience has shown that where great pressure is applied as in a severe stop, the brake support and its associate parts are resiliently deflected by the load to such an extent as to cause an adjustment to take place to take up the apparent excessive clearance. Upon release of the brake pedal, the brake may fail to completely release resulting in excessive noise and friction. Other deflections, such as dishing of the brake disc due to heat of friction may cause additional false indications of apparent excessive clearance resulting in unnecessary clearance adjustments.

It is an object of the present invention to provide an automatic brake adjustment which will respond only to changes in clearance caused by lining wear and not to elastic deflection or springing of brake parts under load.

Another object is to provide an automatic wear-compensator in which a series of resilient spring members are provided in which one spring will be deflected under load due to normal brake shoe movement and a second spring will be deflected under greater movement due to apparent excessive brake clearance and a clearance adjusting pin will be frictionally gripped against movement under loads resulting from normal brake shoe movement and will yield only under loads exceeding that necessary to appreciably deflect the second spring.

These and other objects will appear from the following description and the accompanying drawings.

Figure 1:
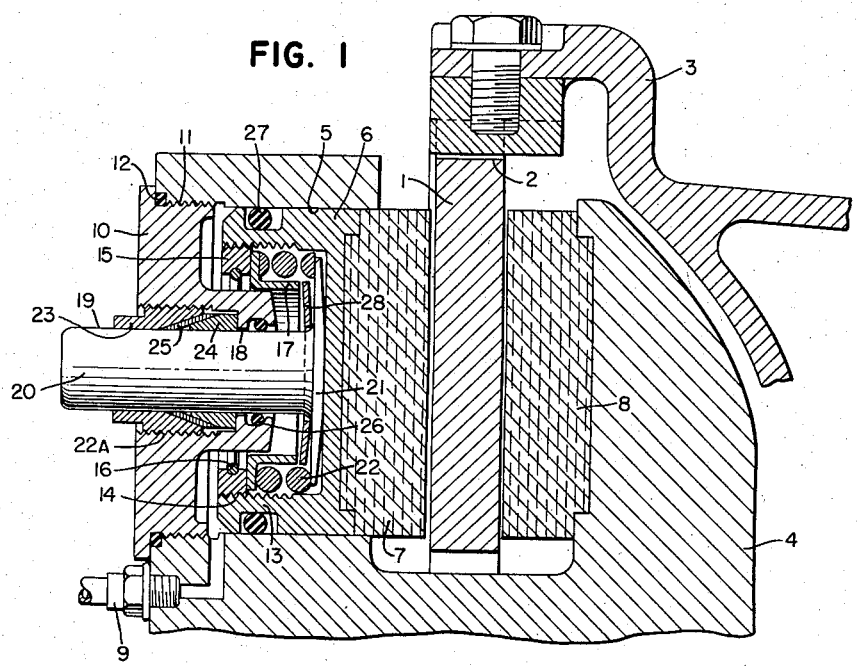
Fig. 1 is a sectional view of a brake operating cylinder and the brake elements constructed in accordance with and embodying the invention.

Referring to the drawings, and first to Fig. 1, thereof, the numeral 1 designates a brake disc having notches 2 about its outer periphery whereby it may be rotated by a wheel 3, the wheel having a plurality of keys for entering notches 2 so as to drive the disc while permitting it to float axially.

Non-rotatably mounted, as on a fixed axle about which the wheel 3 rotates, is a brake support 4 which straddles the disc and is formed with one or more cylinders 5 for receiving a piston 6 carrying a brake block 7 of friction material for engagement with one face of disc 1. The support 4 also carries a stationary brake shoe 8 opposite shoe 7 for engaging the opposite face of the brake disc. A pipe 9 connects the cylinder 5 to the pilot controlled operating valve for supplying hydraulic pressure to advance the piston and apply the brake.

The cylinder 5 has a removable cylinder head 10 secured thereto by threads 11 and sealed thereto by a sealing ring 12. The piston 6 has a rearwardly extending skirt 13 which is internally threaded as at 14 to receive a threaded ring 15 adjustably locked thereto by a spring ring 16 and defining a space between the ring 15 and the head of the piston. A stop collar 17, of L-shaped cross-section, is located in this space with its radial flange abutting the ring 15 and its axial flange extending toward the head of the piston.

The cylinder head 10 is formed with an axial bore 18 for slidably engaging the cylindrical stem 19 of a mushroom-like adjusting pin 20. The head 21 of the adjusting pin extends radially beyond the axial flange of the collar 17 and a compression coil return spring 22 is mounted between the radial flange of collar 17 and the head 21 of the adjusting pin 20 and coaxially of the piston. The coil spring acts to return the piston when the hydraulic pressure is removed.

For frictionally holding the adjusting pin, the cylinder head is formed with an internally threaded counterbore 22a. An externally threaded bushing 23 is mounted in the counterbore and has a conical counterbore for receiving an annular friction grip comprising a conical split ring 24 and a hollow conical sleeve 25 of metal thereabout. The bushing 23 has a polygonal end for tightening it by means of a wrench. A sealing ring 26 is provided between the stem and the adjusting pin 20 and the portion of the cylinder head beyond the counterbore 22.

The piston 6 is sealed to the cylinder 5 by a sealing ring 27 mounted in annular groove of the piston.

For providing additional greater resistance to forward piston movement at great pressures, a concavo-convex deflection-simulating ring 28 of spring metal, known as a "Belleville ring" is mounted about the stem of the adjusting pin 20 with its rim at the concave side thereof facing the axial flange of the ring 17, its inner periphery at its convex side being in contact with the head 21 of the adjusting pin and its outer periphery at the same side being spaced from the head 21.

Figure 2:
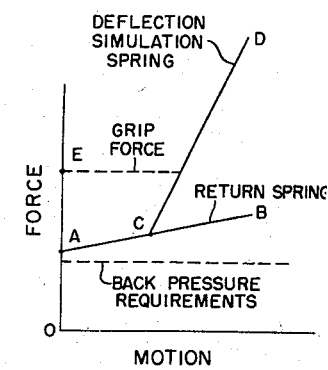
Fig. 2 is a force-motion diagram thereof.

The arrangement is such that under high pressure exerted to move the piston outwardly toward the disc 1, the collar 17 may contact the Belleville ring and flatten it. The resistance to compression of spring 22 is made such that the force necessary to compress it per unit distance is less than that to deflect ring 28, and the deflection simulating spring is proportioned so as to be substantially equal in deflection to the deflection of the brake support in brake operation. Referring to Fig. 2, this diagram shows force plotted vertically against motion plotted horizontally. As hydraulic pressure increases from zero to point A, no deflection of spring 22 takes place. The line A—B represents deflection of spring 22. The line C—D represents deflection of spring 28. As hydraulic pressure is increased beyond point C greater force is necessary to move the piston unit distance than was necessary between points A and C. At force equal to position E the friction grip force on the stem of pin 20 is balanced and the pin can move to a new position of adjustment provided movement of shoe 7 toward the disc is possible. The pin can move no further than the clearance of the brake will permit and upon release of hydraulic pressure, the spring 28 which has been called a deflection-simulating spring will assure return of the brake shoe to a position of normal brake clearance.

It will be noted that no deflection of spring 22 ever rises to the amount of the grip force and that deflection of spring 28 is necessary before adjustment pin 20 is moved. A normal built-in clearance exists between the axial flange of stop ring 17 and spring ring 28 and this is maintained by the recovery of the spring 28 upon brake pressure release. The arrangement is such that deflections of brake parts such as the cylinder support and causing an apparent over normal brake clearance are not effective to move the adjustment pin whereas clearance due to wear results in pin adjustment.

During normal operation of the brake of Fig. 1, with the brake shoe 7 retracted by the normal clearance distance, the piston 6 is held retracted by spring 22, and a normal built-in clearance is present between the deflection-simulating spring 28 and the adjacent axial flange of collar 17. Also, the yielding of spring 28 during the first portion of its movement along line CD and until grip force line E intersects line CD provides additional built-in clearance. Thus, as fluid pressure is applied to piston 6, it moves to the right by an amount less than the built-in clearance and advances the shoe 7 into braking engagement with disc 1. When the fluid pressure is released, spring 22 alone or together with spring 28 retracts the piston to restore normal clearance. It will be understood that sometimes the brake can be applied and released without bringing the axial flange of collar 17 into engagement with spring 28. At other times, for example upon harder stops or after some lining wear, spring 28 will be contacted and operated within area of C to line E, all within the normal brake clearance.

However, as brake lining wear occurs, or under conditions of very severe or panic stops should the piston in its forward movement take up the normal built-in clearance without bringing the shoe 7 into full pressure load engagement with disc 1, the deflection-simulating spring 28 is stressed between collar 17 and the head 21 of pin 20 in the area of the line CD above the intersection with line E (see Fig. 2). Thus, the grip force holding pin 20 is exceeded and the pin moves towards disc 1 to a new position. This occurs only when the hydraulic pressure exerts on the piston a force which exceeds that which causes grip slippage. When fluid pressure is released, spring 28 recovers to force shoe 7 back by a distance at least equal to the distance due to brake deflection, and spring 22 recovers providing again establishing the normal clearance.

Figure 3:
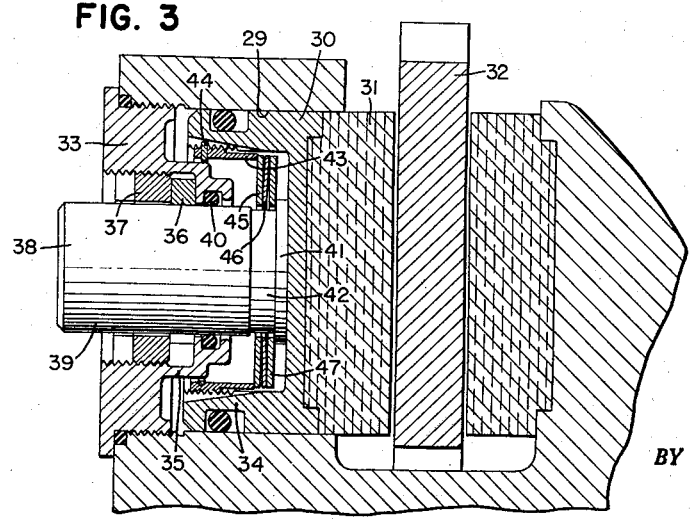
Fig. 3 is a cross-sectional view of a modification of the invention.

In the embodiment illustrated in Fig. 3, the brake cylinder 29 receives a piston 30 movable axially of the cylinder to advance a brake shoe or lining 31 against a brake disc 32. The rear end of the cylinder 29 is closed by a threaded head 33. The piston 30 has a skirt 34 within which extends a hub 35 integral with the cylinder head. The hub 35 is counterbored to receive a friction grip collar 36 held therein by a threaded ring 37. An adjusting pin 38 has a tubular stem 39 of large diameter extending axially through the hub 35, friction grip 36 and ring 37, and sealed to hub 35 by a sealing ring 40. The adjusting pin has an enlarged head 41 separated from the stem 39 by a neck 42 of reduced diameter.

The skirt of the piston is internally threaded to engage a tubular threaded stop collar 43 adjustable therealong and held against movement at any adjustment by a spring lock ring 44.

For returning the piston 30, a plurality of concavo-convex spring washers 45, 46, 47 are mounted about the stem of the adjusting pin and the stop sleeve 43. The arrangement is such that the inner margin of washer 47 bears against the head 41 of the adjusting pin while its outer periphery bears against the outer periphery of washer 46 adjacent thereto and oppositely bowed. The inner periphery of washer 46 in turn bears against the inner periphery of washer 45 adjacent thereto and oppositely bowed. The outer periphery of washer 45 engages stop collar 43 when head 41 engages piston 30.

The piston return spring washer 46 is relatively weak as compared to deflection-simulating spring washers 45 and 47 and has a high rate of deflection. Its function is to return piston 30 from normal movements of the piston under hydraulic pressure applied to the piston.

The deflection-simulating spring washers 45 and 47 are relatively stiff and are for the purpose of adjusting the pin when the piston is moved more than normal movement toward the brake due to wear of the brake or brake part deflection.

The arrangement is such that under normal brake movements, as the piston is advanced toward the brake disc by the hydraulic pressure, stop collar 43 compresses the stack of spring washers 45, 46, 47 and only spring 46 is appreciably deflected.

When hydraulic pressure is released, spring 46 recovers and returns the piston. Should wear of the brake parts increase the brake clearance, the spring washers 45, 47 will be loaded sufficiently to move the adjusting pin to a new position through the friction grip 36.

In the construction of Fig. 3, the piston return and deflection simulating springs are mounted to act in series whereas in the embodiment of Fig. 1, the two springs are mounted to act in parallel. The arrangement of Fig. 3 provides a more compact and neater construction and provides for an adjusting pin of larger diameter.

In both illustrated embodiments of the invention, it will be noted that any hydraulic pressure developed in the cylinder during a braking operation is also applied to the adjusting pin acting over its cross-sectional area. This acts as a force holding the pin against movement in adjusting direction toward the disc. Furthermore, this force, if the hydraulic pressure becomes sufficiently high and if the brake is operating within its normal clearance, can force the pin rearwardly through its friction grip. This provides a force for correcting over-adjustment of the adjusting pin. In the embodiment of Fig. 3, this corrective force is greater than with the embodiment of Fig. 1 due to the relatively large adjusting pin.

Thus, it will be seen that the objects of the invention have been attained.

While a certain representative embodiment and details have been shown for the purpose of illustrating the invention, it will be apparent to those skilled in this art that various changes and modifications may be made therein without department from the spirit or scope of the invention.

What is claimed is:

1. A brake operating cylinder having a piston for advancing a brake shoe under the force of hydraulic pressure, an automatic adjustment pin held frictionally by a friction grip against movement axially of said cylinder under normal braking movements of said piston, axially spaced stop means on said pin and said piston limiting advance movement of said piston without axial movement of said pin, said stop means including spring means mounted between a shoulder of said piston and a shoulder of said adjustment pin for returning said piston when the hydraulic pressure is released, said spring means comprising a first spring mounted between a shoulder of said piston and a shoulder of said pin and having a high rate of deflection for returning the piston under conditions of normal brake clearance, said first spring being of strength and dimensions to be fully compressed with axial closing of the space between said stop means and a second stronger spring having a lower rate of deflection and having a total limit of deflection equal to normal brake clearance for returning the piston from an abnormal movement of the piston resulting from wear of the brake or resilient deflection of brake parts to provide normal brake clearance, said second spring being of strength and dimensions to prevent substantial deflection thereof under a force less than the resistance of said friction grip to movement relative to said pin, said second spring being also mounted between said axially spaced stop means and being compressible by an amount equal to the clearance of the brake, the friction grip on said adjustment pin being clamped to said pin by a force exceeding that necessary to fully deflect said first spring and partially deflect the second spring, and at least one of said spring means comprising a bowed washer of spring metal having a limit of deflection equal to the normal brake clearance.

2. A brake operating cylinder having a piston for advancing a brake shoe under the force of hydraulic pressure, a return spring for returning said piston when the hydraulic pressure is released, said return spring being mounted between a shoulder of said piston and a shoulder of a brake clearance adjusting pin, said shoulders comprising opposed stop means on said piston and said pin limiting deflection of said return spring and normally axially spaced from each other when the brake is in released position, said stop means limiting advance movement of said piston beyond its normal span of movement without movement of the clearance adjusting pin, said clearance adjusting pin being frictionally retained by the head of the cylinder but being adjustable axially thereof under movements of said piston exceeding normal movements due to excessive brake clearance brought about by wear or brake deflection, said stop means including a deflection simulating second spring mounted between a shoulder of said piston and a shoulder of said pin and adapted to yield under advance of said piston beyond normal clearance, said second spring being arranged to match in deflection the deflection of the brake and when released to provide normal clearance of the brake, and at least one of said springs comprising a bowed washer of spring metal having a limit of deflection equal to the normal brake clearance.

3. A brake operating cylinder having a piston for advancing a brake shoe under the force of hydraulic pressure, a return spring for returning said piston when the hydraulic pressure is released, said return spring being mounted between a shoulder of said piston and a shoulder of a brake clearance adjusting pin, said clearance adjusting pin being frictionally retained by the head of the cylinder but being adjustable axially thereof under movements of said piston exceeding normal movements due to excessive brake clearance brought about by wear or brake deflections, axially spaced stop means on said piston and said pin, said stop means limiting movement of said piston and compression of said return spring to the normal travel of said piston during brake application, said stop means including a deflection simulating second spring mounted between shoulders of said piston and said pin and adapted to yield under advance of said piston beyond normal clearance, said second spring being of strength and dimensions to prevent substantial deflection thereof during deflection of the first said spring and being arranged to match in deflection the deflection of the brake and when released to provide normal clearance of the brake, said adjusting pin being held frictionally in said cylinder head by a force greater than that necessary to start deflection of said deflection-simulating spring, and at least one of said springs comprising a bowed washer of spring metal having a limit of deflection equal to the normal brake clearance.

4. In a brake having a rotating brake disc, a brake shoe movable against said disc, a piston operated by a hydraulic cylinder for advancing said shoe toward the disc, a return spring for said piston, an adjusting pin for holding said shoe clear of the brake disc by a desired clearance amount, said pin being held against movement axially of said cylinder by a friction grip and said return spring being mounted under compression between a shoulder of said piston and a shoulder of said pin the frictional grip of said pin exceeding the maximum tension of said return spring, a deflection-simulating second spring the deflection of which matches the deflection of said brake, said second spring being mounted between shoulders of said piston and said pin and being capable of being of such strength and dimensions as to be only partially deflected without moving said pin to a new adjustment and upon recovery providing the desired amount of brake clearance, and at least one of said springs comprising a bowed washer of spring metal having a limit of deflection equal to the normal brake clearance.

References Cited in the file of this patent
UNITED STATES PATENTS 2,531,341    Meador  ---------------- Nov. 21, 1950
2,720,286    Bricker  ---------------- Oct. 11, 1955

UNITED STATES PATENT OFFICE

CERTIFICATE OF CORRECTION

Patent No. 2,900,052                               August 18, 1959

Theodore Frayer et al.

It is hereby certified that error appears in the printed specification of the above numbered patent requiring correction and that the said Letters Patent should read as corrected below.

Column 2, line 35, for "stem and" read -- stem of --; column 5, lines 10 and 11, claim 1, strike out "having a limit of deflection equal to the normal brake clearance".

Signed and sealed this 9th day of February 1960.

(SEAL)
Attest:

KARL H. AXLINE
Attesting Officer

ROBERT C. WATSON
Commissioner of Patents